UNITED STATES PATENT OFFICE.

CHARLES B. JACOBS, OF EAST ORANGE, NEW JERSEY, ASSIGNOR, BY MESNE ASSIGNMENTS, TO THE UNITED BARIUM COMPANY, OF JERSEY CITY, NEW JERSEY, A CORPORATION OF NEW JERSEY.

PIGMENT AND PROCESS OF MAKING SAME.

SPECIFICATION forming part of Letters Patent No. 689,882, dated December 31, 1901.

Application filed February 23, 1901. Serial No. 48,516. (No specimens.)

*To all whom it may concern:*

Be it known that I, CHARLES B. JACOBS, a citizen of the United States, residing at East Orange, county of Essex, and State of New Jersey, have invented certain new and useful Improvements in Compositions of Matter and Processes of Manufacturing Same, of which the following is a full, clear, and exact description.

This invention relates to a composition suitable for use as a pigment, filling, or similar purpose and to the process of manufacturing the same.

The composition consists of a mixture of precipitated zinc hydrate and precipitated barium sulfate in substantially molecular equivalent proportions; and the process consists in mixing solutions of soluble salts of the respective metals, zinc and barium, and causing simultaneous precipitation of the two insoluble salts—namely, zinc hydrate and barium sulfate—the two insoluble salts being thereby obtained in a state of intimate mixture and in molecularly-equivalent proportions and absolutely free from impurities. The resulting mixture is pure white, of great body and extreme fineness.

The process is carried out by dissolving molecular equivalent weights of barium hydrate and zinc sulfate in separate solutions and then mixing the two solutions, when a chemical action sets in and the sulfuric-acid radical of the zinc sulfate and the hydroxyl of the barium hydrate change places, thereby forming the insoluble barium sulfate and the insoluble zinc hydrate, which precipitates and is filtered off and dried for mixing in dry colors or is used in the form of a paste for card and paper sizing. This compound has all of the valuable physical properties of the compound known commercially as "lithopone," which consists in a mixture of barium sulfate and zinc sulfid formed by mixing together solutions of zinc sulfate and barium sulfid, but possesses the additional advantage that it is more permanent and can be mixed with lead paints without discoloration, whereas the compound known as "lithopone" cannot be used with other pigments that contain substances that form dark-colored sulfids.

The reaction involved is as follows:

$$Ba(OH)_2 + ZnSO_4 = Zn(OH)_2 + BaSO_4.$$

Three hundred and fifteen parts, by weight, of crystallized barium hydrate—*i. e.*, $Ba(OH)_2 + 8H_2O$—are dissolved in water, and a solution containing two hundred and eighty-seven parts, by weight, of white vitriol—*i. e.*, $ZnSO_4 + 7H_2O$—is added to the barium-hydrate solution with constant stirring, producing three hundred and thirty-two parts, by weight, of the precipitate consisting of equivalent molecular proportions of zinc hydrate and barium sulfate.

If the solutions of the barium hydrate and zinc sulfate are made dilute, the precipitate will be of extremely smooth and fine grain and will be well suited for use as a pigment.

The intermixture of the barium sulfate and zinc hydrate is much more intimate than can be obtained by grinding the separately-precipitated bodies together, as the simultaneous precipitation of the two substances from a mixed solution gives a mixture wherein the molecules of each substance are uniformly diffused or interspersed among the molecules of the other substance. The mixture may therefore be termed a "molecular" mixture.

Having thus described my invention, the following is what I claim as new therein and desire to secure by Letters Patent:

1. The composition of matter consisting of molecular equivalent proportions of zinc hydrate and barium sulfate, in a state of fine division and molecular mixture.

2. The process of manufacturing a permanent white pigment, consisting in mixing solutions containing equivalent molecular proportions of barium hydrate and zinc sulfate; and thereby producing a precipitate consisting of a mixture of insoluble zinc hydrate and insoluble barium sulfate in molecular equivalent proportions.

3. The process of manufacturing a permanent white composition, consisting in precipitating a mixture of zinc hydrate and barium sulfate simultaneously from solutions of the respective metals.

CHARLES B. JACOBS.

Witnesses:
J. GREEN,
ARTHUR P. KNIGHT.